United States Patent
Trebouet et al.

(10) Patent No.: US 10,730,449 B2
(45) Date of Patent: Aug. 4, 2020

(54) DEVICE FOR PROTECTING AN OPTICAL SENSOR, DRIVING ASSISTANCE SYSTEM AND CORRESPONDING ASSEMBLY METHOD

(71) Applicant: Valeo Systèmes d'Essuyage, Le Mesnil Saint Denis (FR)

(72) Inventors: Marcel Trebouet, Le Mesnil Saint Denis (FR); Frédéric Bretagnol, Issoire (FR); Giuseppe Grasso, Issoire (FR)

(73) Assignee: Valeo Systémes d'Essuyage, Le Mesnil Saint Denis (FR)

( * ) Notice: Subject to any disclaimer, the term of this patent is extended or adjusted under 35 U.S.C. 154(b) by 48 days.

(21) Appl. No.: 15/981,352

(22) Filed: May 16, 2018

(65) Prior Publication Data

US 2018/0334109 A1 Nov. 22, 2018

(30) Foreign Application Priority Data

May 17, 2017 (FR) ...................................... 17 54334

(51) Int. Cl.
*G02B 1/00* (2006.01)
*B60R 11/04* (2006.01)
(Continued)

(52) U.S. Cl.
CPC ................ *B60R 11/04* (2013.01); *B60R 1/08* (2013.01); *B60S 1/56* (2013.01); *G02B 27/0006* (2013.01); *G02B 27/01* (2013.01); *G02B 27/0149* (2013.01); *G03B 17/08* (2013.01); *B08B 7/00* (2013.01); *G02B 2027/0138* (2013.01)

(58) Field of Classification Search
CPC .. B60R 11/04; B60R 1/08; B60R 1/00; B60R 2011/004; B60R 2300/806; B60S 1/56; G02B 27/0006; G02B 2027/0138; G02B 27/01; G02B 27/0149; G03B 17/08; B08B 7/00
See application file for complete search history.

(56) References Cited

U.S. PATENT DOCUMENTS 3,879,742 A 4/1975 Smith
5,315,333 A 5/1994 Nash
(Continued)

FOREIGN PATENT DOCUMENTS

KR 20070034729 A 3/2007

OTHER PUBLICATIONS

Preliminary Search Report and Written Opinion issued in corresponding French Application No. 1754334, dated Jan. 8, 2018 (6 pages).

*Primary Examiner* — Euncha P Cherry
(74) *Attorney, Agent, or Firm* — Osha Liang LLP

(57) ABSTRACT

A device for protecting an optical sensor of a driver-assistance system for a motor vehicle, a corresponding driver-assistance system and a corresponding assembling process are disclosed. The optical sensor includes an optic and two assembled separate subassemblies. A first subassembly is mounted so as to be able to rotate about an axis of rotation and includes a housing that is configured to at least partially receive the optical sensor and an optical element that is configured to be placed upstream of the optic of the optical sensor. A second subassembly includes an actuator that is configured to drive the first subassembly to rotate.

15 Claims, 6 Drawing Sheets

(51) Int. Cl.
  *G03B 17/08* (2006.01)
  *G02B 27/00* (2006.01)
  *B60S 1/56* (2006.01)
  *B60R 1/08* (2006.01)
  *G02B 27/01* (2006.01)
  *B08B 7/00* (2006.01)

(56) References Cited

U.S. PATENT DOCUMENTS

2011/0181725 A1 7/2011 Matsuura et al.
2011/0291597 A1* 12/2011 Kern ..................... H02P 6/20
                                                              318/400.11

* cited by examiner

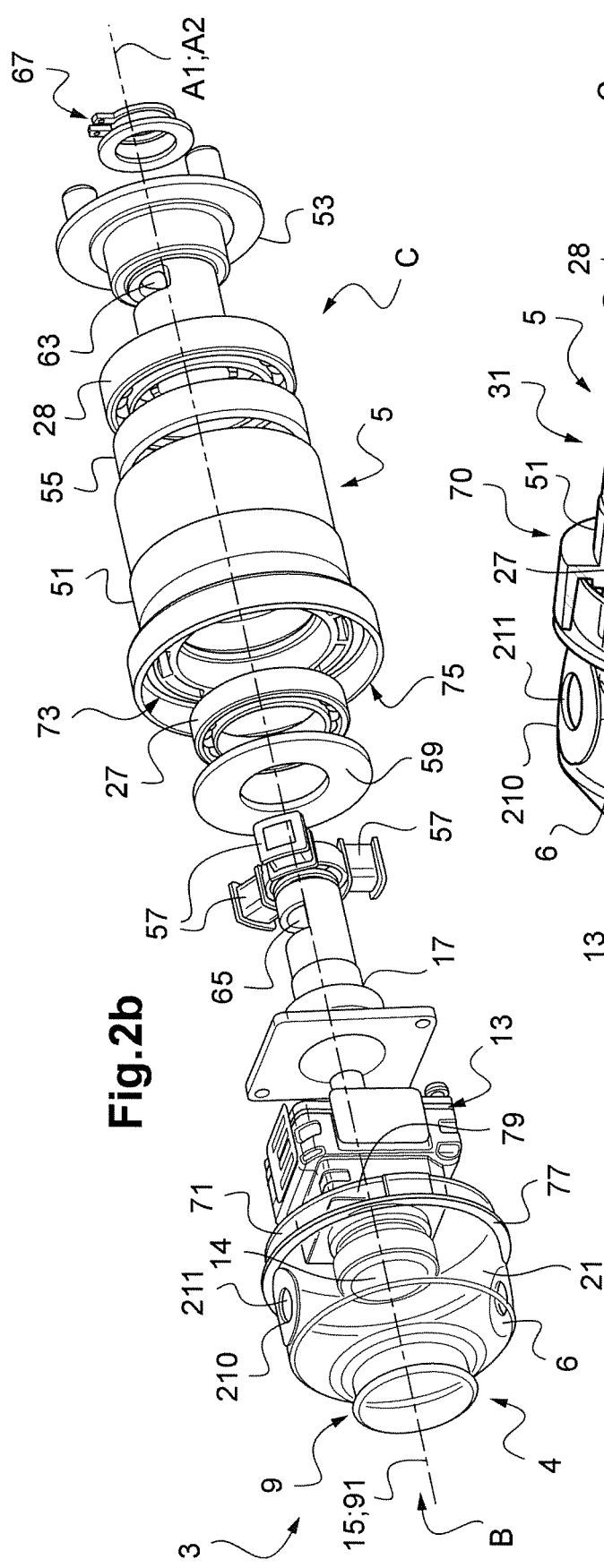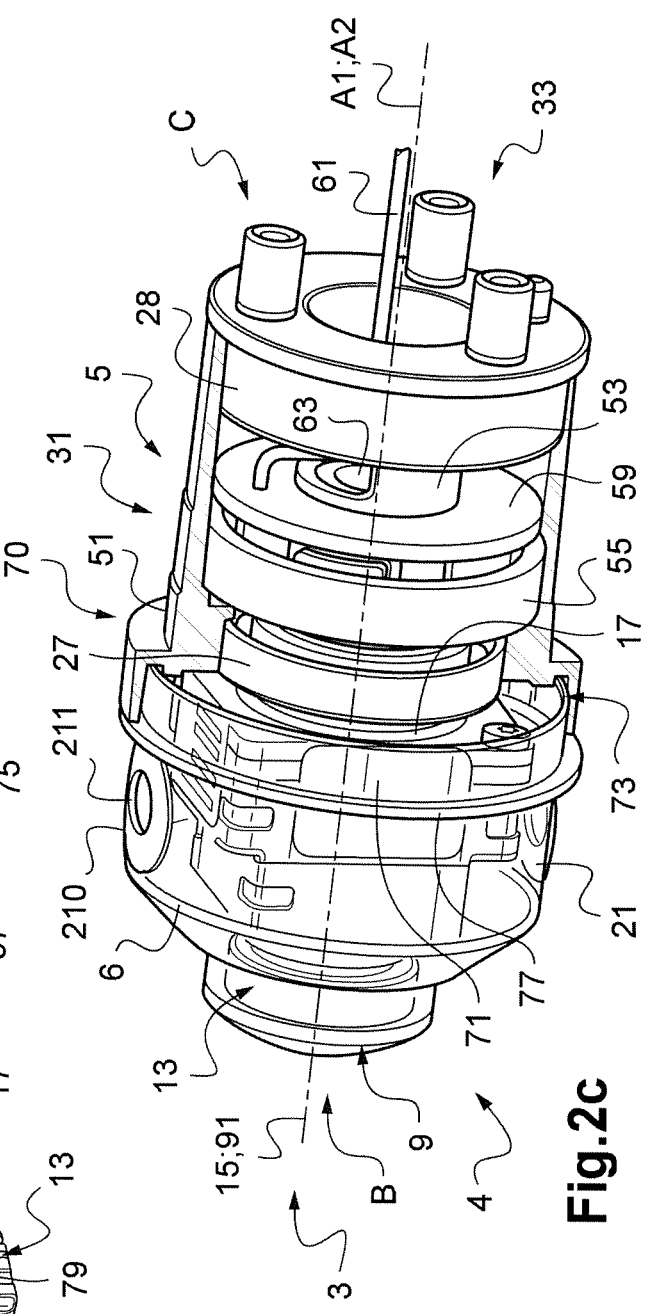

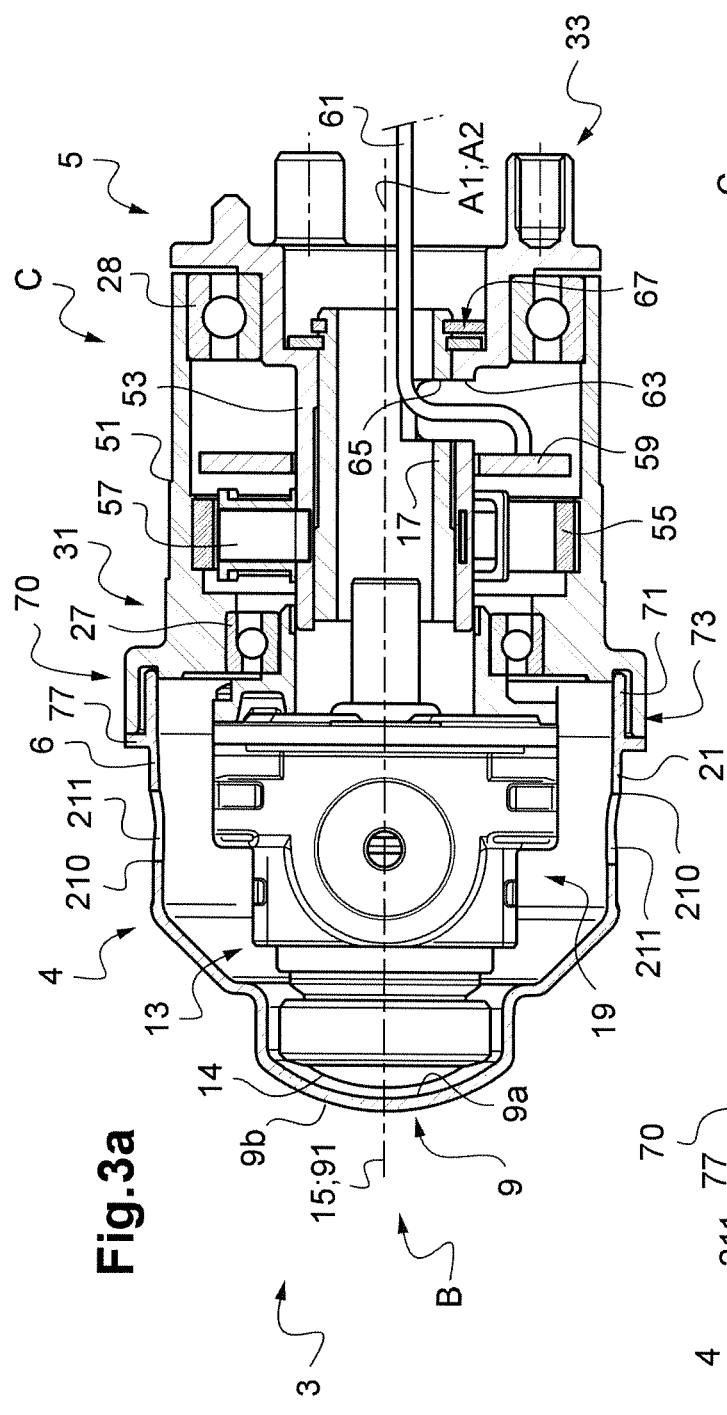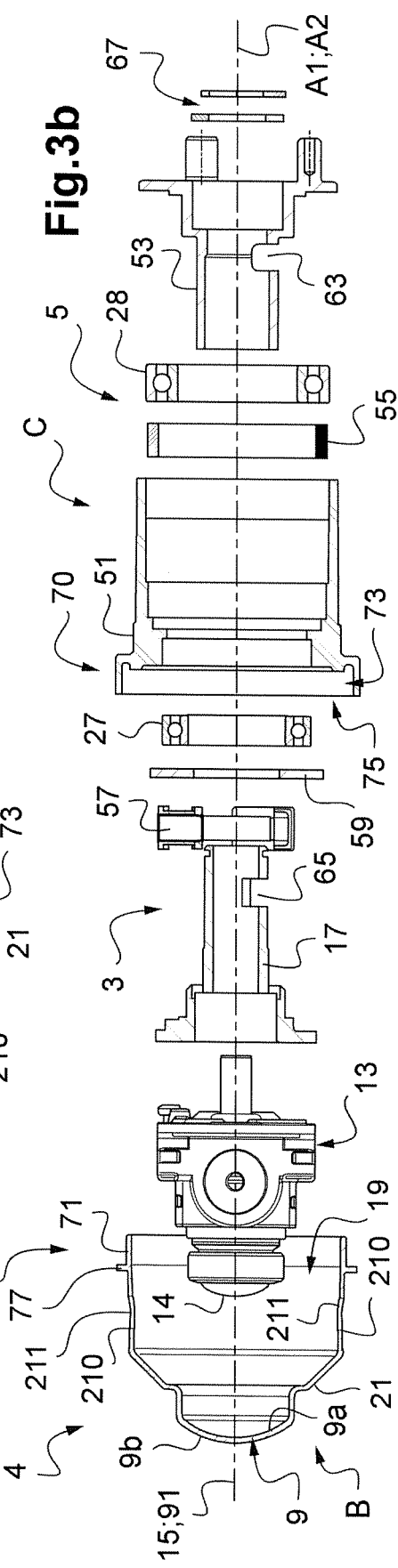

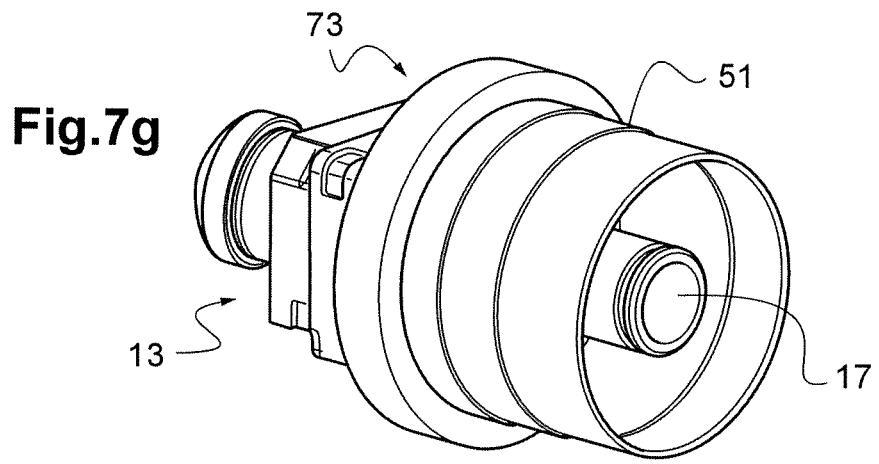
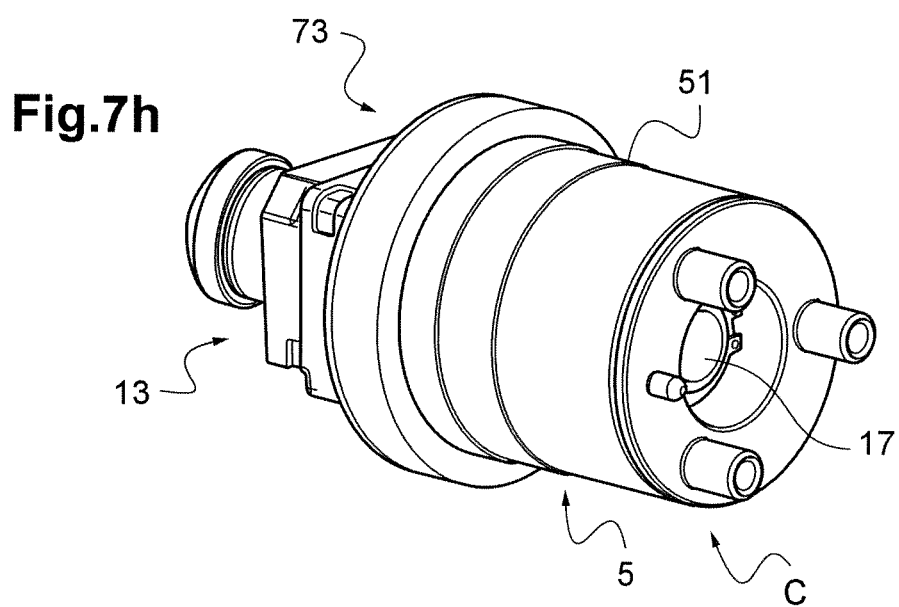
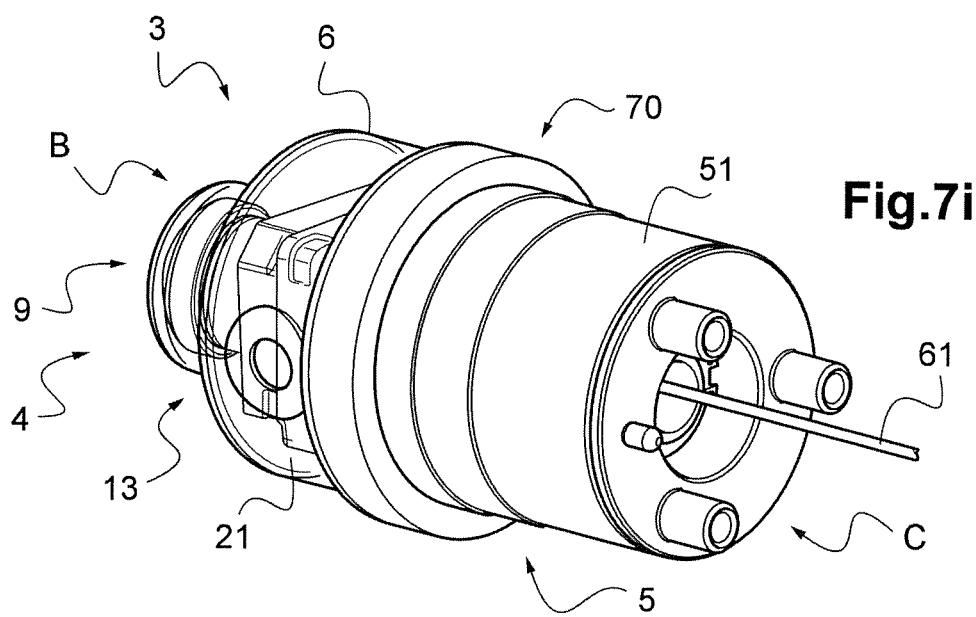

DEVICE FOR PROTECTING AN OPTICAL SENSOR, DRIVING ASSISTANCE SYSTEM AND CORRESPONDING ASSEMBLY METHOD

The present invention relates to the field of assisting drivers and in particular to driver-assistance systems, which are installed in certain vehicles, the driver-assistance system possibly including an optical sensor, such as for example a camera comprising an objective, in particular comprising at least one lens. More particularly, the invention relates to a device for protecting such an optical sensor. The invention also relates to a process for assembling such a protecting device.

Currently, many motor vehicles are equipped with front-, rear- or even side-view cameras. They in particular form part of driver-assistance systems, such as parking-assistance systems, or even systems for detecting lane departure.

Cameras that are installed in the interior of the passenger compartment of a vehicle against the rear windscreen/window and that point backward through the rear windscreen of the vehicle are known. These cameras are well protected from exterior climatic events and grime caused by mineral or organic pollutants. However, the angle of view for such cameras, installed in the interior of the passenger compartment, is not optimal, in particular for a parking-assistance system, for example because they do not allow obstacles located in proximity to the rear of the vehicle to be seen.

For this reason, it is therefore preferred to install the cameras of driver-assistance systems on the exterior of vehicles in various locations depending on the desired use, for example in the region of the front or rear bumper, or in the region of the front or rear number plate of the vehicle. In this case, the camera is therefore highly exposed to being spattered with organic or mineral dirt that may be deposited on its optic and thus decrease its effectiveness, or even make it inoperative. In particular, during periods of wet weather, rain and dirt is observed to spatter, this spatter possibly greatly affecting the operability of the driver-assistance system comprising such a camera. The surfaces of the optics of these cameras must be cleaned in order to guarantee they remain in a good operating state.

To counter the deposition of dirt on the camera, it is known to arrange a device for cleaning the optic of the camera, generally a sprayer of cleaning liquid, in proximity thereto, in order to remove the polluting elements that are deposited over time. However, the use of these sprayers leads to an increase in the operating costs of such a driver-assistance system because they require quite large amounts of cleaning liquid to be used.

According to one known solution, means for vibrating a protecting window of the camera are provided in order to shed dirt from the protecting window of the camera. However, it has been observed that the effectiveness of such a device for tenacious and encrusted grime may be limited despite the vibration of the protecting window.

According to another solution, the camera is arranged in a protecting device. However, such a protecting device is very bulky to install. As is known, it is constantly sought to decrease bulk in the automotive field, and more particularly in the field of driver-assistance systems.

Lastly, the assembly of these protecting devices with the camera for installation in the motor vehicle is not optimized.

The present invention proposes to at least partially mitigate the aforementioned drawbacks by providing an alternative device for protecting an optical sensor, allowing the deposition of grime on an optical sensor, such as a camera, to be prevented.

The present invention also aims to decrease the bulk and to facilitate the assembly of the protecting device.

To this end, one subject of the invention is a device for protecting an optical sensor of a driver-assistance system for a motor vehicle, the optical sensor comprising an optic, characterized in that the protecting device includes two assembled separate subassemblies:
 a first subassembly of which is mounted so as to be able to rotate about an axis of rotation and includes a housing that is configured to at least partially receive the optical sensor and an optical element that is configured to be placed upstream of the optic of the optical sensor; and
 a second subassembly of which includes an actuator that is configured to drive the first subassembly to rotate.

The term "separate" is understood to mean the fact that the two subassemblies may be produced separately, independently of each other. Only the interface allowing the two subassemblies to be assembled must be designed or suitable for allowing the two subassemblies to be assembled. The assembly interface may be made suitable by suitably designing the actuator and/or the housing.

This creates flexibility as to the optical sensor intended to be mounted in the protecting device i.e. intended to be arranged behind the optical element so as to be protected by the first subassembly. Specifically, any type of optical sensor may be encased by the first subassembly and the holder of the optical sensor may be designed to slot into the second subassembly.

Furthermore, the second subassembly is not arranged in the interior of the first subassembly. The housing need therefore not be overdimensioned to also house the actuator.

Lastly, these two subassemblies may be assembled together and installed in a motor vehicle without requiring an additional common holder.

Said device for protecting the optical sensor may furthermore have one or more of the following features, individually or in combination:
 the actuator is a motor comprising a stator and a rotor;
 said device includes at least one assembling means borne by the first subassembly and/or borne by the second subassembly;
 said device includes at least one first assembling means borne by the first subassembly;
 the housing of the first subassembly has, on its periphery, at least one first assembling means;
 the housing has a peripheral skirt forming a first assembling means;
 the first assembling means, such as the peripheral skirt, is arranged on the side opposite to the optical element;
 said device includes at least one second assembling means borne by the second subassembly;
 said at least one second assembling means is configured to interact with said at least one first assembling means;
 said at least one second assembling means is provided on the periphery of an element of the actuator of the second subassembly;
 the element of the actuator bearing the second assembling means is arranged facing the housing;
 said at least one second assembling means includes a peripheral throat;
 the peripheral throat is complementary to the peripheral skirt of the first assembling means;

the actuator is assembled with the housing on the side opposite to the optical element;

the rotor comprises said at least one second assembling means;

said device includes at least one means for locking the first subassembly assembled with the second subassembly;

the locking means may be chosen from a snap-fastening means, adhesive bonding, welding, or even ultrasonic welding;

the optical element and the housing form a single part;

the optical element is placed centred with respect to the axis of rotation of the first subassembly;

said device furthermore includes a holder of the optical sensor;

the motor is hollow;

the hollow motor is configured to receive an interconnect of the optical sensor, in particular for power supply and/or processing of the signal;

the stator is hollow so as to at least partially receive the holder of the optical sensor;

the rotor is hollow so as to at least partially receive the holder of the optical sensor;

the motor is a brushless motor comprising electromagnetic coils that are securely fastened to the stator and a magnet that is securely fastened to the rotor;

said device includes at least two bearings;

the second subassembly includes at least two bearings arranged between a fixed portion and a movable portion of the protecting device;

the second subassembly includes at least one magnetic bearing arranged between the fixed portion and the movable portion of the protecting device, in particular between the stator and the rotor of the motor, or between the rotor and the holder of the optical sensor.

The invention also relates to a driver-assistance system including an optical sensor comprising an optic. According to the invention, said system includes a device for protecting the optical sensor such as defined above.

According to one aspect of the invention, the optical element is placed centred with respect to the optical sensor.

The invention also relates to a process for assembling the protecting device such as defined above, comprising the following steps:

on the one hand, the first subassembly is produced, said first subassembly including the housing that is configured to at least partially receive the optical sensor, and the optical element that is configured to be placed upstream of the optic of the optical sensor;

on the other hand, the second subassembly is produced, said second subassembly including the actuator that is configured to drive the first subassembly to rotate; and the two subassemblies are assembled.

Thus, the two subassemblies may be assembled simply, allowing the protecting device to be rapidly installed.

In particular, the two subassemblies may be received ready to be assembled with each other. No additional operations need to be carried out: for example, the motor does not need to be placed in the housing before the optical sensor can be put in place and the optical element does not need to be secured to the housing. It is also not necessary to make provision for an additional operation in which the two subassemblies are placed side-by-side, for example in a common holder, before the assembly can be installed in a motor vehicle.

According to one aspect of the invention, said process comprises the following substeps, in which:

the optical sensor is mounted on a holder; and the holder of the optical sensor is arranged in the interior of a hollow element of the actuator of the second subassembly.

According to another aspect of the invention, the first subassembly and the second subassembly are assembled with each other in a direction parallel to the optical axis of the optical sensor.

Advantageously, the first subassembly and the second subassembly are assembled so as to be aligned along the optical axis of the optical sensor.

Other features and advantages of the invention will become more clearly apparent on reading the following description, which is given by way of nonlimiting illustrative example, and the appended drawings, in which:

FIG. 1 schematically shows a motor vehicle comprising a driver-assistance system according to the invention;

FIG. 2b is an exploded view of FIG. 2a;

FIG. 2c is a perspective view of the protecting device of FIG. 2a, with the second subassembly in partial longitudinal cross section;

FIG. 3a is a partial longitudinal cross-sectional view of the protecting device of FIGS. 2a to 2c;

FIG. 3b is an exploded view of FIG. 3a;

FIGS. 7a to 7i illustrate steps of assembling the protecting device of FIGS. 2a to 3b.

In these figures, identical elements have been referenced with the same references.

The following embodiments are examples. Although the description refers to one or more embodiments, this does not necessarily mean that each reference relates to the same embodiment, or that the features apply only to just one embodiment. Single features of various embodiments may also be combined or interchanged in order to create other embodiments.

In the description, certain elements, such as for example the first element or second element, may be indexed. In this case, the index is simply used to differentiate and denote elements that are similar but not identical. This indexing does not imply a priority of one element with respect to another and such denominations may easily be interchanged without departing from the scope of the present description. This indexing also does not imply an order in time.

Figure 1:
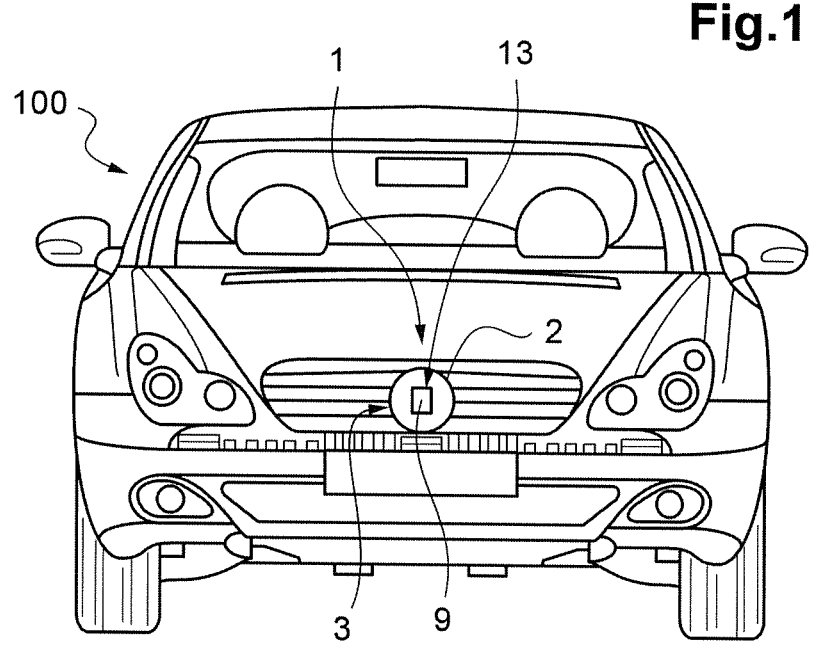
Figure 2A:
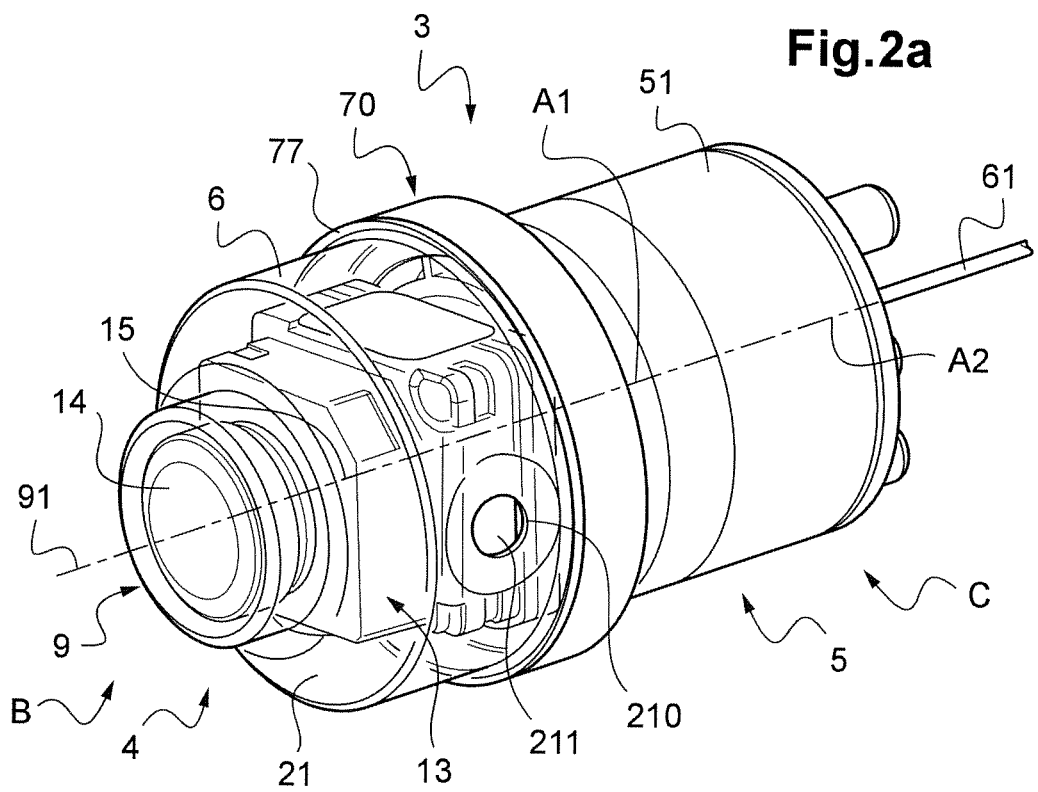
FIG. 2a is a perspective view of a device for protecting an optical sensor of the driver-assistance system of FIG. 1, comprising a first and a second subassembly.
Figure 4:
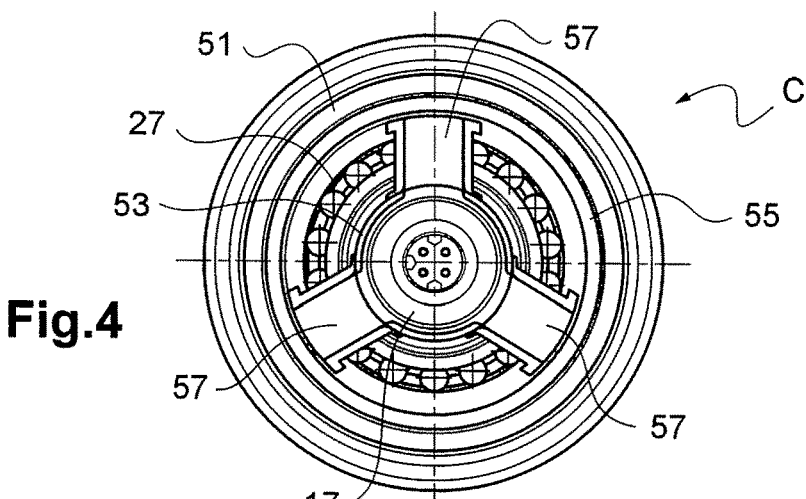
FIG. 4 is a transverse cross-sectional view of the second subassembly of the protecting device of FIGS. 2a to 3b.

FIG. 1 shows a motor vehicle 100 equipped with at least one driver-assistance system 1 according to the invention.

The driver-assistance system 1 in particular includes at least one optical sensor 13 and a device 3 for protecting the optical sensor 13, which may be more clearly seen in FIGS. 2a to 3b.

The optical sensor 13 is for example an image-capturing optical sensor 13 such as a camera. It may be a CCD (charge-coupled device) sensor or a CMOS sensor including a matrix array of miniature photodiodes. According to another variant, it may be a LIDAR sensor, LIDAR standing for "light detection and ranging".

As may be more clearly seen in FIGS. 2a to 3b, the optical sensor 13 includes an optic 14 of optical axis 15. The optic 14 is for example an objective. An objective may include at least one lens, and in particular, depending on the field of view and resolution, a plurality of lenses, for example between two and ten lens, generally four or five lenses, or even ten lenses in the case of a fish-eye. At least one of the lenses of the optic 14 is for example convex (curved), its convexity for example being oriented toward the exterior of the optical sensor 13, for a fish-eye for example.

A holder 17 (FIGS. 2b to 3b) of the optical sensor 13 may also be provided. This holder 17 is arranged behind the optical sensor 13 on the side opposite to the optic 14.

In the illustrated embodiment, the optical sensor 13 is intended to be mounted in the protecting device 3. More precisely, the optical sensor 13 and in particular its holder 17 are intended to be fixedly mounted in the protecting device 3.

In the example illustrated in FIG. 1, the protecting device 3 is installed at the front of the vehicle 100 in the region of a bumper. Of course, as a variant, the protecting device 3 may be installed at the rear of the vehicle 100, for example in the region of the bumper or number plate. It may also for example be installed on the sides of the vehicle, for example in the region of the rearview mirrors.

The protecting device 3 may be fastened, using any known technique, to any element 2 of the vehicle 100, such as to an element of the body or to an exterior element such as a bumper, a rearview mirror or a number plate. For this purpose, mention may be made, non-exhaustively, of a system of clips, a screwing system, or even an adhesive-bonding system.

Protecting Device

More precisely, with reference to FIGS. 2a to 6, the protecting device 3 includes a first subassembly B and a second subassembly C that are separate from and assembled with each other. In other words, the two subassemblies B and C form, when they are assembled, the protecting device 3.

Advantageously, these two subassemblies B and C are aligned along the optical axis 15 of the optical sensor 13.

The first subassembly B is mounted so as to be able to rotate about an axis of rotation A1. According to the described embodiment, this first subassembly B forms an accessory 4 for a motor vehicle 100, the function of which is to protect the optical sensor 13. The first subassembly B includes a housing 6 that is configured to at least partially receive the optical sensor 13, and an optical element 9 that is configured to be placed upstream of the optic 14 of the optical sensor 13. At least certain elements of the first subassembly B may be partially or completely transparent.

The second subassembly C includes an actuator 5, more precisely a motor 5, that is configured to drive the first subassembly B to rotate. The protecting device 3 is therefore a motorized device.

The various elements of these two subassemblies B and C are described in more detail below.

First Subassembly

The optical element 9 is securely fastened to the housing 6 (see FIGS. 2a to 3b, 5 and 6). The optical element 9 and the housing 6 may form a single part. Alternatively, the housing 6 and the optical element 9 may be two separate securely-fastened parts.

The housing 6 and the optical element 9 are able to rotate about the axis of rotation A1. The axis of rotation A1 of the housing 6 and of the optical element 9 is advantageously coincident with the optical axis 15 of the optical sensor 13.

More precisely, the housing 6 is arranged so as to be driven to rotate by the motor 5, this allowing the optical element 9 to be driven to rotate. The optical element 9 is therefore driven to rotate with the housing 6, so as to allow the optical element 9 to be cleaned via a centrifugal effect.

Preferably, the housing 6 is a seal-tight housing. The housing 6 may be made of any suitable material known to those skilled in the art.

The optical sensor 13 is at least partially mounted in the housing 6. For this purpose, the housing 6 includes a compartment 19 (see FIGS. 3a, 3b) that is configured to receive the optical sensor 13. More precisely, the housing 6 includes a wall 21 defining the compartment 19 for the optical sensor 13.

This wall 21 may be centred on the axis of rotation A1 of the optical element 9 and of the housing 6. In this example, the wall 21 is of substantially cylindrical general shape. The wall 21 and the optical element 9 may form a single part. As a variant, the wall 21 and the optical element 9 may be two separate securely-fastened parts. In particular the front end of the wall 21 is securely fastened to the optical element 9. By way of nonlimiting example, the wall 21 and the optical element 9 may be securely fastened by ultrasonic welding. Thus, the housing 6 and the optical element 9 may be one or more parts. Since the housing 6 is securely fastened to the optical element 9, a seal-tight unit is formed that thus prevents grime from getting into the interior of the housing 6 that is intended to receive the optical sensor 13.

As a variant or in addition, provision is advantageously made for at least one means for limiting condensation, this means being referred to below as the anti-condensation means. Such an anti-condensation means may be integrated into the housing 6. In particular, at least one anti-condensation means may be arranged on the wall 21 of the housing 6.

By way of nonlimiting example, the anti-condensation means may comprise at least one through-orifice 210 in the housing 6, in this example in the wall 21 (see FIGS. 2a to 3b). The one or more orifices 210 may be produced by drilling. Preferably, when a plurality of orifices 210 are provided, they are arranged symmetrically with respect to the axis of rotation A1 of the housing 6.

In the example illustrated in FIGS. 3a and 3b, two orifices 210 are provided, said orifices being arranged symmetrically with respect to the axis of rotation A1 of the housing 6. The orifices 210 communicate between the interior of the housing 6 and the exterior of the housing 6 when the protecting device 3 has been assembled. By way of nonlimiting example, each orifice 210 may have a diameter of about 5 mm.

In addition, provision may be made for one or more semipermeable membranes 211, said membranes being arranged at least in one orifice 210, respectively. Two membranes 211 are schematically shown in FIGS. 3a and 3b. Each membrane 211 may be seal-tight fastened to an associated orifice 210, for example by adhesive bonding or even by ultrasonic welding. These membranes 211 are, in the described embodiments, permeable to air and impermeable to water. The one or more membranes 211 thus promote the circulation of air in the interior of the housing 6. This allows good ventilation to be achieved between the optic 14 and the optical element 9 and thus prevents condensation from accumulating.

Advantageously, provision is furthermore made for at least one means for compensating for the lesser weight of the orifice 210 or orifices 210. In the particular example illustrated in FIGS. 3a and 3b, the two membranes 211 are placed symmetrically with respect to the axis of rotation A1 of the housing 6 and it is this symmetric arrangement that allows weight effects to be limited with respect to the centrifugal force during the rotation of the housing 6.

The optical element 9, for its part, is intended to protect the optic 14 of the optical sensor 13 from potential spatter with grime or solid debris that could damage this optic 14. It is therefore a question of an element for protecting, or more precisely a mask for protecting, the optical sensor 13, and it is this optical element 9 that is subjected to aggressions originating from the exterior, i.e. to water spatter, pollutants, small pieces of stone, but also pollutant deposits or water stains.

When the protecting device 3 is installed in the vehicle 100 (the reader is also referred to FIG. 1), the optic 14 and the optical element 9 advantageously protrude from an aperture provided in the element 2 of the vehicle 100.

In the described embodiment, the optical element 9 is separate from the optical sensor 13.

This optical element 9 has an optical axis 91.

The optical element 9 is arranged at the front of the protecting device 3. In the illustrated example, the optical element 9 is arranged at the front of the accessory 4, or even at the front of the housing 6. The expression "front of the housing 6" or, more generally, "front of the protecting device 3" is understood to mean the portion intended to be placed facing the road scene images of which the optical sensor 13 participates in capturing, when the protecting device 3 is installed in the vehicle 100 (the reader is also referred to FIG. 1). In contrast, the expression "rear of the housing 6" or "rear of the protecting device 3", respectively, is understood to mean the portion opposite the front; it is therefore a question of the portion that is furthest from the road scene images of which the optical sensor 13 participates in capturing.

Furthermore, the optical element 9 is intended to be placed upstream of the optical sensor 13, and more precisely upstream of the optic 14 (FIGS. 2a to 3b, 5 and 6). In the present text, the term upstream is defined with respect to the optical axis 15 and with respect to the road scene images of which the optical sensor 13 participates in capturing. In other words, the expression "upstream of the optic 14" is understood to mean a position in which the optical element 9 is placed between the optic 14 and the road scene images of which the optical sensor 13 participates in capturing, along the optical axis 15.

This optical element 9 is advantageously dimensioned so as to cover all of the surface of the optic 14. The optical element 9 is therefore arranged in the field of view of the optical sensor 13. To this end, the optical element 9 is transparent in order not to decrease the effectiveness of the optical sensor 13. This optical element 9 may be made of glass or of a transparent plastic such as polycarbonate.

The optical element 9 may be arranged centred with respect to the optical sensor 13, and more precisely centred with respect to the optic 14. The optical element 9 is arranged so that its optical axis 91 is coincident with the optical axis 15 of the optical sensor 13.

The optical axis 91 is in this example also coincident with the axis of rotation A1 of the optical element 9. In other words, the optical element 9 may be placed centred with respect to the axis of rotation A1.

The optical element 9 may in particular be axisymmetric with respect to the axis of rotation A1.

In the described embodiment, the optical element 9 includes an internal surface 9a and an external surface 9b that are opposite. The internal surface 9a and external surface 9b are completely or partially located in the field of view of the optical sensor 13 when the optical sensor 13 is in the housing 6.

The internal surface 9a and external surface 9b may be substantially planar, or completely planar, in the field of view of the optic 14 of the optical sensor 13.

As a variant, the internal surface 9a and external surface 9b may be of aspherical, or even hyperbolic, general shape.

Moreover, in order to prevent condensation forming between the optic 14 and the optical element 9, the internal surface 9a of the optical element 9 advantageously has an anti-fog property. The internal surface 9a of the optical element 9 is the surface intended to be arranged facing the optic 14 of the optical sensor 13. In particular, the internal surface 9a of the optical element 9 has an anti-fog coating.

As a variant or in addition, the internal surface 9a and/or the external surface 9b of the optical element 9 may have one or more of the following properties: hydrophobic, infrared filter, photocatalytic, superhydrophobic, lipophobic, hydrophilic, or even superhydrophilic, stone-chip resistant, or even any other surface treatment allowing the adhesion of grime to be decreased.

In particular, by virtue of the hydrophobic properties of the external surface 9b of the optical element 9, any water droplets will run off the external surface 9b without leaving stains because the water will not be able to adhere to this external surface. This allows the possibility of adherence of mineral or organic pollutants and the presence of water stains on the optical element 9, which could adversely affect correct operation of the driver-assistance system (G) 1, to be limited. Advantageously, a liquid solution, such as a solution of the Rain-X® type, may be deposited on the external surface 9b of the optical element 9 in order to form a hydrophobic pellicule.

These example embodiments are given by way of non-limiting illustration. For example, those skilled in the art will be able to use a transparent optical element 9 having an external surface 9b having other properties allowing the adherence of grime to this external surface 9b to be limited.

Optionally, the optical element 9 of the projecting device 3 may also comprise an integrated defrosting or demisting system in order to make it possible to guarantee that the driver-assistance system 1 is able to operate correctly whatever the meteorological conditions, such as a defrosting resistor or filament for example.

Second Subassembly

As described above, the second subassembly C may include a motor 5 for driving the first subassembly B to rotate. To this end, the motor 5 is coupled to the housing 6 so as to drive the housing 6 and the optical element 9 to rotate.

The motor 5 is mounted so as to be able to rotate about an axis of rotation A2. The axis of rotation A2 may be coincident with the axis of rotation A1 of the first subassembly B, and with the optical axis 15 of the optical sensor 13.

Moreover, provision is advantageously made for a seal-tight arrangement for the passage of cables or wires to the rear of the motor 5, in order to limit the ingress of water vapour and/or other contaminants into the interior of the protecting device 3.

The motor 5 includes a rotor 51 and a fixed stator 53, the rotor 51 being able to rotate with respect to the fixed stator 53.

The housing 6 and the optical element 9 are securely fastened to the rotor 51 of the motor 5.

In the examples illustrated in FIGS. 3a to 5, the rotor 51 is placed around the stator 53. The stator 53 is therefore internal and the rotor 51 external. Moreover, in the example of FIG. 5, the stator 53 may form the holder 17 of the optical sensor 13. In other words, the holder 17 and the stator 53 form a single part.

Figure 6:
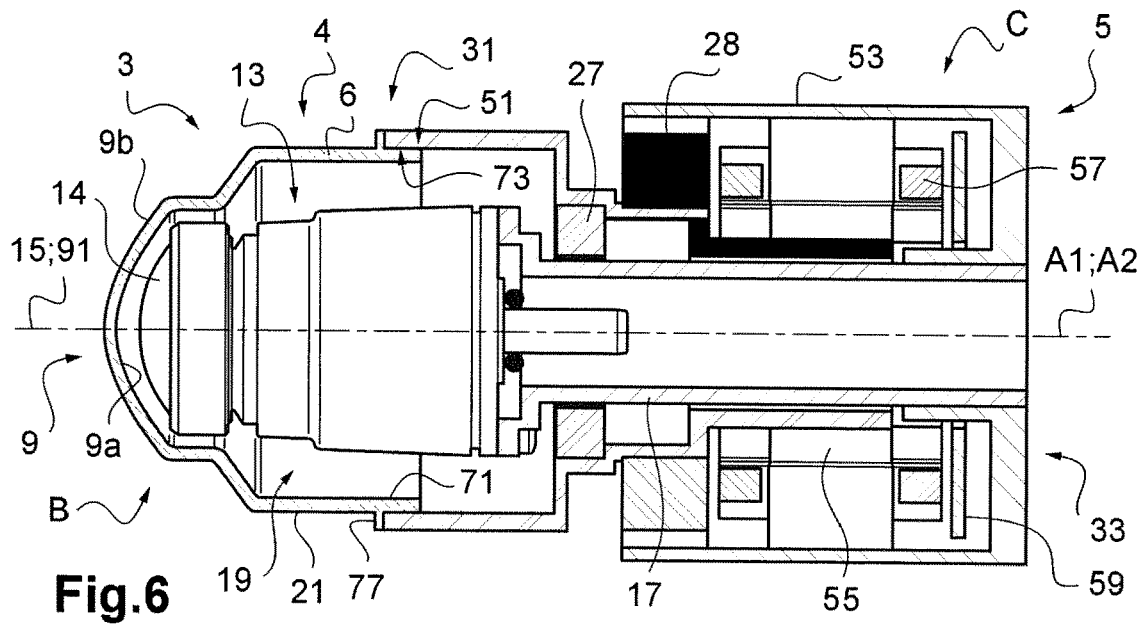
FIG. 6 is another variant of the protecting device.

Alternatively, as illustrated in FIG. 6, the stator 53 may be arranged around the rotor 51.

Moreover, the motor 5 is assembled with the rear of the housing 6. In the described embodiment, the motor 5 is assembled with the housing 6 on the side opposite to the optical element 9. Thus, a seal-tight unit is formed that thus prevents grime from getting into the interior of the housing 6 that is intended to receive the optical sensor 13.

Furthermore, the motor 5 is in this example arranged in the extension of the optical sensor 13. The accessory 4, the optical sensor 13 and the motor 5 are in this example aligned along the optical axis 15 of the optical sensor 13.

The motor 5 is advantageously hollow. It may at least partially receive the optical sensor 13. In particular, in the illustrated configuration, the hollow motor 5 may receive the holder 17 of the optical sensor 13 at the rear of the optical sensor 13, i.e. on the side opposite to the optic 14.

In the configuration illustrated in FIGS. 2b to 3b with the internal stator 53 and the external rotor 51, the stator 53 may at least partially receive the holder 17 of the optical sensor 13.

Figure 5:
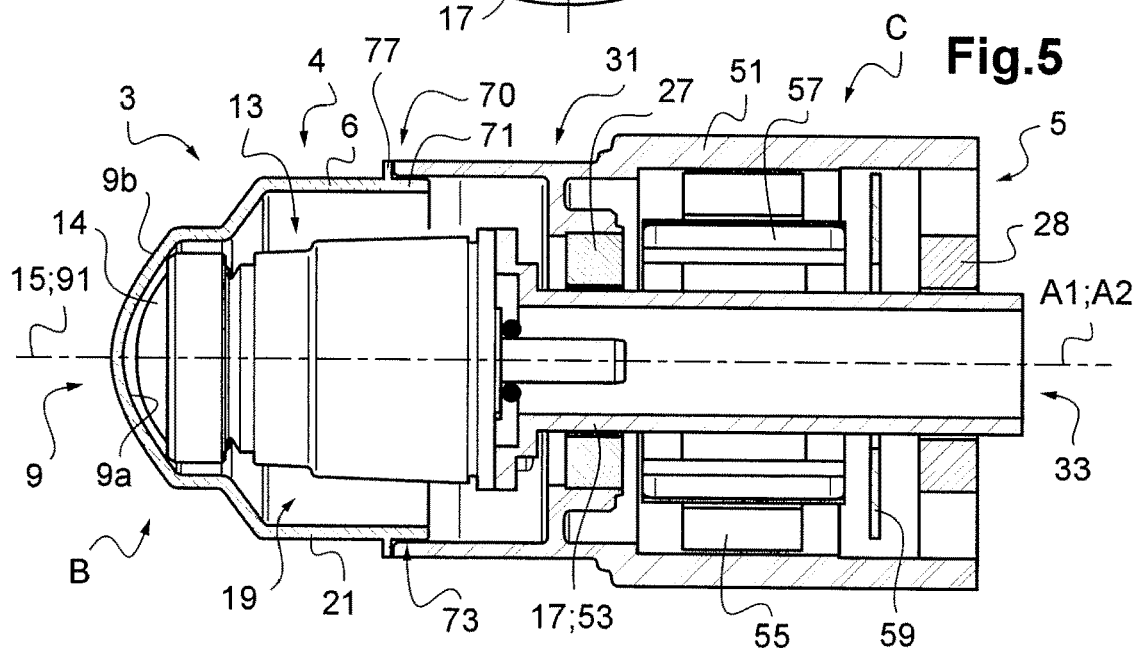
FIG. 5 is one variant of the protecting device.

In the configuration illustrated in FIG. 5, with the external rotor 51 and the stator 53 forming the optical holder 17, the hollow rotor 51 may at least partially receive the stator 53 forming the holder 17 of the optical sensor 13.

In the configuration illustrated in FIG. 6 with the internal rotor 51, it is the latter that may at least partially receive the holder 17 of the optical sensor 13.

The motor 5 is for example supplied with electrical power by a power supply that is connected to the general electrical circuit of the vehicle 100 (the reader is also referred to FIG. 1).

It may in particular be a question of an electric motor of small size, or even of a miniature electric motor.

The expression "electric motor of small size" is understood to mean, in the context of the present invention, a stepper motor, an actuator, a brushed or brushless DC motor, an asynchronous motor or a synchronous motor, the weight of which is lower than 10 kg, or even lower than 1 kg, and that is in particular used to actuate equipment in vehicles.

The expression "miniature electric motor" is understood to mean, in the context of the present invention, a stepper motor, an actuator, a brushed or brushless DC motor, an asynchronous motor or a synchronous motor, the weight of which is lower than 200 g, or even lower than 100 g, and preferably comprised between 30 g and 100 g, and for example between 30 g and 60 g.

By way of nonlimiting example, the motor 5 may more particularly be a brushless motor. In the example illustrated in FIGS. 2b to 4, the motor 5 comprises at least one magnet 55 that is securely fastened to the rotor 51, and a predefined number of electromagnetic coils 57, in particular at least three electromagnetic coils 57 that are mounted on the stator 53. The electromagnetic coils 57 are intended to be supplied with power in order to allow the magnet 55 that is securely fastened to the rotor 51 to be driven. The motor 5 comprises, for this purpose, a circuit 59 for controlling the supply of power to the electromagnetic coils 57. This control circuit 59 may be connected to a power-supply wiring harness 61 that is connected to the general electric circuit of the vehicle 100 (the reader is also referred to FIGS. 1 and 3a).

The motor 5 may have a speed of rotation comprised between 1000 and 50000 revolutions/minute, preferably between 5000 and 20000 revolutions/minute, and even more preferably between 7000 and 15000 revolutions/minute. Such speeds of rotation allow any grime that has been deposited on the optical element 9 to be removed via a centrifugal effect and thus allow the optical element 14 of the optical sensor 13 to be kept clean in order to ensure the driver-assistance system 1 operates optimally.

The protecting device 3 therefore includes a movable portion 31, also called the rotating portion 31, and a fixed portion 33 (see FIG. 3a, 5 or 6).

The movable portion 31 comprises at least the rotor 51 of the motor 5 and at least one movable element that is securely fastened to the rotor 51, such as in particular the accessory 4, i.e. the housing 6 and the optical element 9 in this example.

The fixed portion 33 comprises at least the stator 53 of the motor 5. Likewise, the fixed portion 33 may also comprise an element or holder that is fastened to the stator 53. Of course, the element or holder may or may not be fastened directly to the stator 53. Nonlimitingly, in this example, the fixed portion 33 of the motorized device 3 includes the fixed holder 17 of the optical sensor 13. This fixed holder 17 is in particular fastened to the stator 53. The holder 17 of the optical sensor 13 and the stator 53 advantageously include respective complementary apertures 63, 65 in order to allow the control circuit 59 to be connected to the power-supply wiring harness 61, such as may be more clearly seen in FIG. 3a.

Furthermore, the protecting device 3, and more particularly the second subassembly C, may in particular comprise one or more bearings 27, 28 (see FIGS. 2b to 6). In the examples of FIGS. 2b to 6, the second subassembly C comprises two bearings 27, 28.

These bearings 27, 28 are each arranged between the movable portion 31 and the fixed portion 33 of the protecting device 3. The bearings 27, 28 are of substantially annular general shape. In addition, the two bearings 27, 28 are arranged concentrically with the motor 5.

With reference to the particular example illustrated in FIG. 3a or in FIG. 6, one of the bearings, for example the bearing 27 may be placed between the rotor 51 and a portion, in particular a front portion, of the holder 17 of the optical sensor 13. The other bearing, the bearing 28 in these examples, is placed between the rotor 51 and the stator 53 of the motor 5. Alternatively, the two bearings 27 and 28 may be arranged between the rotor 51 and the stator 53.

Alternatively, the two bearings 27 and 28 may be arranged between the rotor 51 and the stator 53. In particular, in the variant embodiment illustrated in FIG. 5, the two bearings 27, 28 are arranged between the rotor 51 and the stator 53 that form the holder 17 of the optical sensor 13.

In the example illustrated in FIGS. 2b to 4, the bearings 27 and 28 are shown as being ball bearings. Of course, other variants are envisageable. Advantageously, at least one of the bearings 27, 28 may be a magnetic bearing. Such a magnetic bearing allows the noise and friction generally generated when a protecting device 3 using mechanical bearings is operated to be avoided. According to one variant, one bearing may be magnetic and the other bearing may be a mechanical bearing such as a ball bearing. According to another variant, the motorized device 3 may comprise a single magnetic bearing.

Lastly, provision may be made for means 67, such as clips, for constraining the bearings 27, 28 (see FIGS. 2b to 3b).

Assembly

With reference to FIGS. 2b to 3b, 5 and 6, in order to allow the first subassembly B to be assembled with the second subassembly C, the protecting device 3 includes at least one assembling means borne by the first subassembly and/or borne by the second subassembly.

In the described embodiment, the protecting device 3 furthermore includes at least one first assembling means 71 that is borne by the first subassembly B. Complementarily, the protecting device 3 may also include at least one second complementary assembling means 73 that is borne by the second subassembly C.

The or each first assembling means 71 is for example provided in order to interact with a second complementary assembling means 73 that is associated and complementary.

The use of the terms first and second, with regard to the first assembling means 71 and the second assembling means 73, allows these elements to be differentiated and denoted. This denomination does not imply a priority or dependence of one assembling means with respect to the other and such denominations may easily be interchanged without departing from the scope of the present description.

Generally, the one or more first assembling means 71 and the one or more second assembling means 73 may be called complementary assembling means 70. In particular, it is a question of complementary assembling means 70 that are borne on the one hand by the first subassembly B and on the other hand by the second subassembly C.

The coupling between the two subassemblies B and C may occur on the periphery of each subassembly B, C. More precisely, this coupling may occur on the periphery of the housing 6, of cylindrical general shape, and on the periphery of the rotor 51.

In other words, the housing 6 of the first subassembly B has, on its periphery, one or more first assembling means 71. Complementarily, the rotor 51 of the second subassembly C has, on its periphery, one or more second assembling means 73 that are provided to interact with the one or more assembling means 71 of the housing 6.

In the various illustrated embodiments, the housing 6 has a peripheral skirt forming a first assembling means 71. Complementarily, the rotor 51 has a peripheral throat forming a second assembling means 73 and that is configured to receive the peripheral skirt on assembly of the two subassemblies B and C. The peripheral skirt and the peripheral throat are referenced 71 and 73 below, respectively.

The first assembling means 71, in this example the peripheral skirt 71, is arranged on the side opposite to the optical element 9. This corresponds to the rear of the housing 6, and more generally to the rear of the first subassembly B.

The second assembling means 73, in this example the peripheral throat, is arranged on the side of the rotor 51 located facing the housing 6.

In other words, the housing 6 and the rotor 51 each have an assembling interface allowing the two subassemblies B and C to be assembled. In the described embodiment, the peripheral skirt 71 of the housing 6 forms an assembling interface. Complementarily, the end 75 of the rotor 51 (see FIGS. 2b and 3b) comprising the peripheral wall bounding the peripheral throat 73 forms a complementary assembling interface. It is a question of a longitudinal or axial end 75.

In addition, seal-tightness between the two subassemblies B and C, i.e., in this example, between the housing 6 and the rotor 51, may be achieved by adhesive bonding. Of course, any other means known to those skilled in the art may be used to achieve the seal-tightness between the two subassemblies B and C.

Moreover, provision may be made for a stopping means such as an abutment 77 allowing the axial movement of the rotor 51 to be limited. This abutment 77 is for example formed by a peripheral rib on the housing 6. In the illustrated examples, the peripheral skirt 71 extends from this peripheral rib or abutment 77 in the direction of the motor 5.

Lastly, provision may be made for at least one locking means 79 (see FIG. 2b) allowing the first subassembly B and the second subassembly C to be held and locked in the assembled position. By way of nonlimiting example, this locking may be achieved by snap-fastening. Provision may be made, to this end, for one or more snap-fastening means 79, such as a snap-fastening lug configured to engage in a corresponding aperture (not shown) in the wall of the rotor 51 bounding the peripheral throat 73. Provision may in particular be made for the locking to be achieved via a combined movement consisting of a rotation followed by snap-fastening.

As a variant, the locking may be achieved by adhesive bonding, welding, or even ultrasonic welding. Of course, any other means known to those skilled in the art may be used to ensure the two subassemblies B and C remain locked in position.

Assembly Process

With reference to FIGS. 7a to 7i, the protecting device 3 such as described above with reference to FIGS. 2a to 4 may be assembled using an assembling process comprising the following steps:

on the one hand, the first subassembly B is produced;
on the other hand, the second subassembly is produced; and
the two subassemblies B and C are assembled.

Of course, the assembling process such as described above may also apply to the variants illustrated in FIGS. 5 and 6.

As mentioned above, the first subassembly B may be produced in such a way that the housing 6 and the optical element 9 form a single part.

Production of the second subassembly C may comprise carrying out various assembling steps.

Figure 7A:
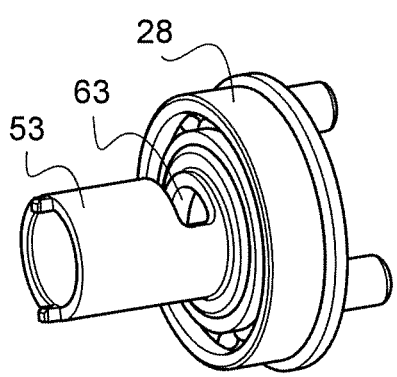
Figure 7B:
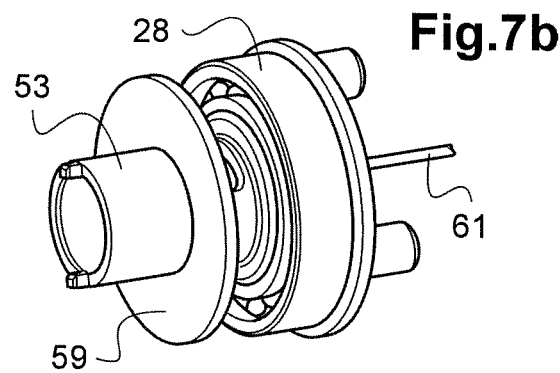
Figure 7D:
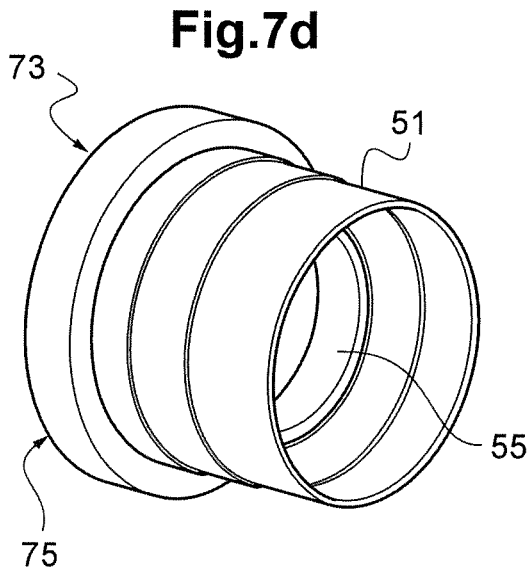
Figure 7C:
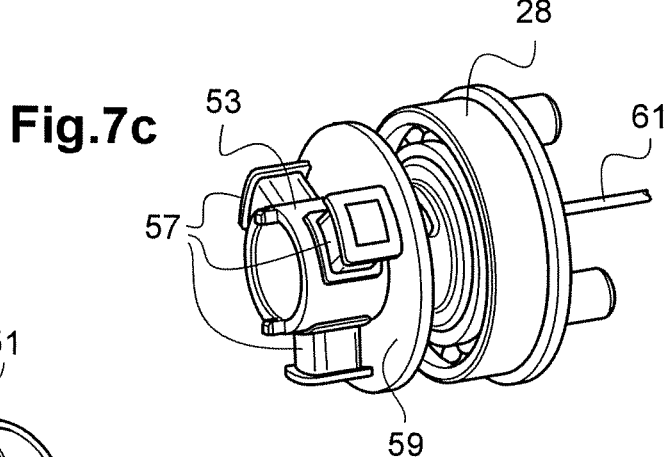
Figure 7E:
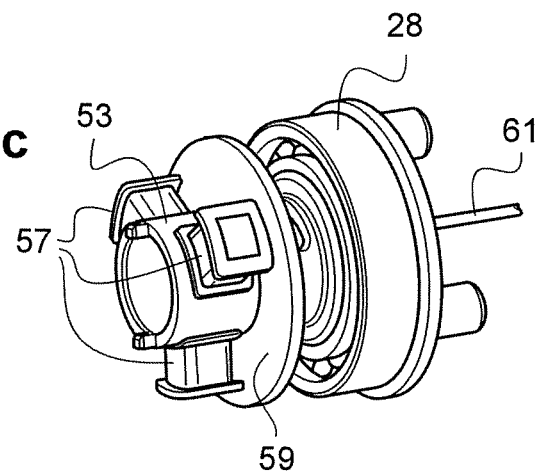
Figure 7F:
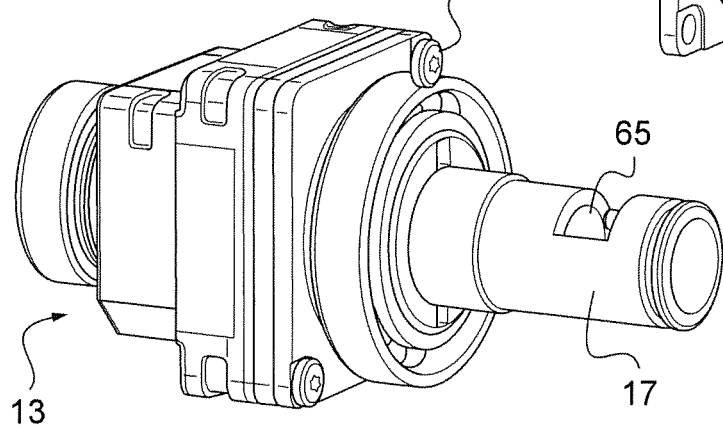

In a step illustrated in FIG. 7a, the bearing 28 may be placed around the stator 53. The control circuit 59 may then be placed around the stator 53 in front of the bearing 28 (see FIG. 7b). This control circuit 59 may subsequently be connected to the power-supply wiring harness 61. In another step illustrated in FIG. 7c, the electromagnetic coils 57 may be fastened to the stator 53.

In parallel, before or after these various steps, the magnet 55 may be fastened to the rotor 51, for example in the interior of the rotor 51 (see FIG. 7d), or as a variant on the exterior of the rotor 51 in the configuration of FIG. 6 with an internal rotor 51 and an external stator 53.

Next, the rotor 51 and the stator 53 may be assembled.

In an intermediate step of the assembling process, the optical sensor 13 is mounted on the holder 17.

In another intermediate step, and in particular before the two subassemblies B and C are assembled, the holder 17 of the optical sensor 13 may be arranged in the interior of the motor 5 of the second subassembly C (FIGS. 7g and 7h).

The optical sensor 13 may be arranged in the interior of the housing 6 of the first subassembly B (see FIG. 7i), in particular after the first subassembly B has been assembled with the second subassembly C, in which the holder 17 of the optical sensor 13 is mounted.

In particular, the first subassembly B and the second subassembly C are assembled with each other in a direction parallel to the optical axis 15 of the optical sensor 13.

Furthermore, in the illustrated embodiments, the two subassemblies B and C are assembled so as to be aligned along the optical axis 15.

Lastly, the two subassemblies B and C may be locked in their position assembled with each other. Moreover, provision may furthermore be made for one or more steps in which the protecting device 3 is made seal-tight.

Of course, the order of the steps of this process may be reversed.

Thus, in operation, the actuator, and more precisely the motor 5, drives the housing 6 and the optical element 9 that is securely fastened to the housing 6 to rotate with respect to the optical sensor 13. The rotation of the housing 6 and of the optical element 9 ensures the removal of grime via the centrifugal force that the latter experiences. The field of view of the optical sensor 13 is thus always free and clean.

In addition, the fact that this protecting device 3 is produced in two separate subassemblies B and C that are easily assembled allows the assembly of the protecting device 3 and its installation in the motor vehicle 100 to be simplified.

The invention claimed is:

1. A device for protecting an optical sensor of a driver-assistance system for a motor vehicle, the optical sensor comprising an optic, the protecting device comprising:
   two assembled separate subassemblies, a first subassembly and a second subassembly, wherein:
     the first subassembly is mounted to be able to rotate about an axis of rotation and comprises a housing that is configured to at least partially receive the optical sensor and an optical element that is configured to be placed upstream of the optic of the optical sensor;
     the second subassembly comprises an actuator that is configured to drive the first subassembly to rotate, the actuator being a motor comprising a stator and a rotor.

2. The device according to claim 1, further comprising at least one first assembling means borne by the first subassembly.

3. The device according to claim 2, wherein the housing of the first subassembly has, on its periphery, a peripheral skirt as the at least one first assembling means.

4. The device according to claim 2, further comprising at least one second assembling means borne by the second subassembly.

5. The device according to claim 4, wherein the rotor comprises said at least one second assembling means.

6. The device according to claim 1, further comprising at least one means for locking the first subassembly assembled with the second subassembly.

7. The device according to claim 1, wherein the optical element and the housing form a single part.

8. The device according to claim 1, further comprising a holder of the optical sensor.

9. The device according to claim 1, wherein the motor is hollow.

10. The device according to claim 9, wherein the motor is a brushless motor comprising electromagnetic coils that are securely fastened to the stator and a magnet that is securely fastened to the rotor.

11. A driver-assistance system for a motor vehicle, said driver-assistance system comprising: the device for protecting the optical sensor according to claim 1; and the optical sensor comprising the optic.

12. A process for assembling the device for protecting according to claim 1, comprising:
   producing the first subassembly comprising:
     the housing that is configured to at least partially receive the optical sensor, and
     the optical element that is configured to be placed upstream of the optic of the optical sensor;
   producing the second subassembly comprising the actuator that is configured to drive the first subassembly to rotate; and
   assembling the first and the second subassemblies together.

13. The process according to claim 12, further comprising the following substeps:
   mounting the optical sensor on a holder; and
   arranging the holder of the optical sensor in the interior of a hollow element of the actuator of the second subassembly.

14. The process according to claim 13, wherein the first subassembly and the second subassembly are assembled with each other in a direction parallel to the optical axis of the optical sensor.

15. The device according to claim 1, wherein the housing comprises at least one orifice and at least one semipermeable membrane that is permeable to air and impermeable to water as anti-condensation means.

* * * * *